United States Patent [19]

Andersen et al.

[11] Patent Number: 4,979,494
[45] Date of Patent: Dec. 25, 1990

[54] METHOD AND APPARATUS FOR GENERATING THERMAL ENERGY

[76] Inventors: John I. Andersen, 1317 E. 65 North, Idaho Falls, Id. 83401; Michael J. Andersen, 114 W. 3rd South #7, Rexburg, Id. 83440

[21] Appl. No.: 414,405

[22] Filed: Sep. 29, 1989

[51] Int. Cl.$^5$ .............................................. F24J 2/02
[52] U.S. Cl. .................................... 126/451; 126/424; 126/438
[58] Field of Search ............... 126/451, 438, 439, 424, 126/425; 350/606, 631; 353/3

[56] References Cited

U.S. PATENT DOCUMENTS

| | | | |
|---|---|---|---|
| 4,195,775 | 4/1980 | Pitts | 126/438 |
| 4,218,114 | 8/1980 | Bunch | 126/438 X |
| 4,249,511 | 2/1981 | Krisst et al. | 126/451 X |
| 4,408,595 | 10/1983 | Broyles et al. | 126/438 X |

FOREIGN PATENT DOCUMENTS 2565678 12/1985 France .................................. 126/451
3520694  1/1986 German Democratic Rep. ..................................... 126/438

Primary Examiner—Larry Jones
Attorney, Agent, or Firm—Hopkins, French, Crockett, Springer & Hoopes

[57] ABSTRACT

A solar cooking apparatus, and method for its use, wherein the apparatus comprises an offset focus reflecting parabolic dish and a food receptacle located at or outside of a cylinder defined by the periphery of the dish. The dish is rotatably affixed to a base member in a manner permitting infinite settings to track the sun through azimuth and elevation. The food receptacle is adjustable from maximum heat at the focal point of the dish to lesser heat at a defocused point away from the focal point. The offset focus parabolic dish preferably has a diameter equal to or less than the radius of a prime focus parabolic dish from which it is taken.

12 Claims, 4 Drawing Sheets

METHOD AND APPARATUS FOR GENERATING THERMAL ENERGY

BACKGROUND OF THE INVENTION

The present invention relates to a method and apparatus for generating thermal energy, and more particularly, for the solar cooking of food and water using an offset focus reflecting parabolic dish.

For years proposals have been made for constructing devices to adequately utilize the sun's rays to generate thermal energy, with particular application in the cooking of food or boiling of water, thereby reducing electricity or fuel use necessary for such preparation. The conversation of scarce fuel sources, whether they be petrochemical, wood or dung, is especially acute in developing countries. Forests have been denuded in the search for firewood, wrecking havoc with the delicate balance of local ecosystems. Therefore, any device capable of reducing the need for such scarce, not easily renewable resources, is desireable.

Solar cooking devices have been proposed for such use. U.S. Pat. No. 4,696,285 discloses a solar cooker having an insulated oven affixed to the backside of a primary solar reflector. A secondary reflector reflects the solar radiation from the primary reflector into the oven, which is centered within the primary reflector. The secondary reflector is adjustable so as to vary the amount of solar rays entering the oven. The reflector apparatus is gimballed on a frame which travels about an arcuate path.

U.S. Pat. No. 4,281,644 discloses a solar cooker foldable into a briefcase-type unit. The cooker comprises a pair of housing halves which are pivotally affixed to one another to be moved from a closed to an open position. A pair of support arms carry a spit above the centerpoint of the reflecting dish. U.S. Pat. No. 4,083,357 discloses a parabolic trough reflector having a cooking oven disposed within the trough. Folding leg assemblies are provided, as is a sliding lock member permitting the vertical tracking of the sun. Similarly, U.S. Pat. No. 4,262,660 discloses a solar cooking trough having an expandable parabolic reflector with a solar oven disposed over the centerpoint of the reflector. Extension arms are detachably connected to the solar cooker in order to vary the distance between the reflecting surface and the oven.

Lastly, U.S. Pat. No. 4,274,397 discloses a solar heater having a window cover positioned to transmit solar radiation to a reflector. The reflector reflects the incoming solar radiation to a container. When filled with water, the container may be heated sufficiently to boil the water.

SUMMARY OF THE INVENTION

The present invention comprises a method and apparatus for solar cooking using an offset focus reflecting parabolic dish. Such dishes have a focal point offset from the vertex, or center-point of the dish. Preferably, the offset focus dish of the present invention is structured such that the focal point is at or outside of a cylinder defined by the periphery of the dish. The apparatus further comprises an adjustable cooking unit which may be positioned at the focal point of the dish or "defocused" away from the focal point. Lastly, adjustment means are provided to permit the dish to be adjusted to track the sun in azimuth and elevation.

The adjustment means permits rotation of the dish about any axis during tracking of the sun through the arc from dawn to dusk (the azimuth). The adjustment means comprises a spheroid member firmly affixed to a base and a pair of cupped clamping means securely affixed to the dish and frictionally engaged with and on either side of the spheroid member.

The offset focus reflecting dish of the present invention is configured with its elliptical diameter being the radius of a larger, prime focus parabolic dish. The cooking unit comprises a frame member with a food receptacle adjustably affixed thereto. The food receptacle is adjustable from a position at the focal point of the dish (for maximum cooking) to any point along the frame member providing less solar energy input because the unit is "defocused".

The invention also comprises a method of cooking food using solar energy which comprises the steps of concentrating solar rays on a food receptacle using an offset focus reflecting parabolic dish, locating the focal point and the food receptacle at or outside of the periphery of the dish, and infinitely adjusting the dish about adjustment means to track the sun in both azimuth and elevation.

Therefore, it is an object of the present invention to provide a device to generate thermal energy, and specifically to provide a solar cooking apparatus which permits the safe and efficient preparation of food or boiling of water without endangering the operator.

DETAILED DESCRIPTION OF THE INVENTION

Figure 1:
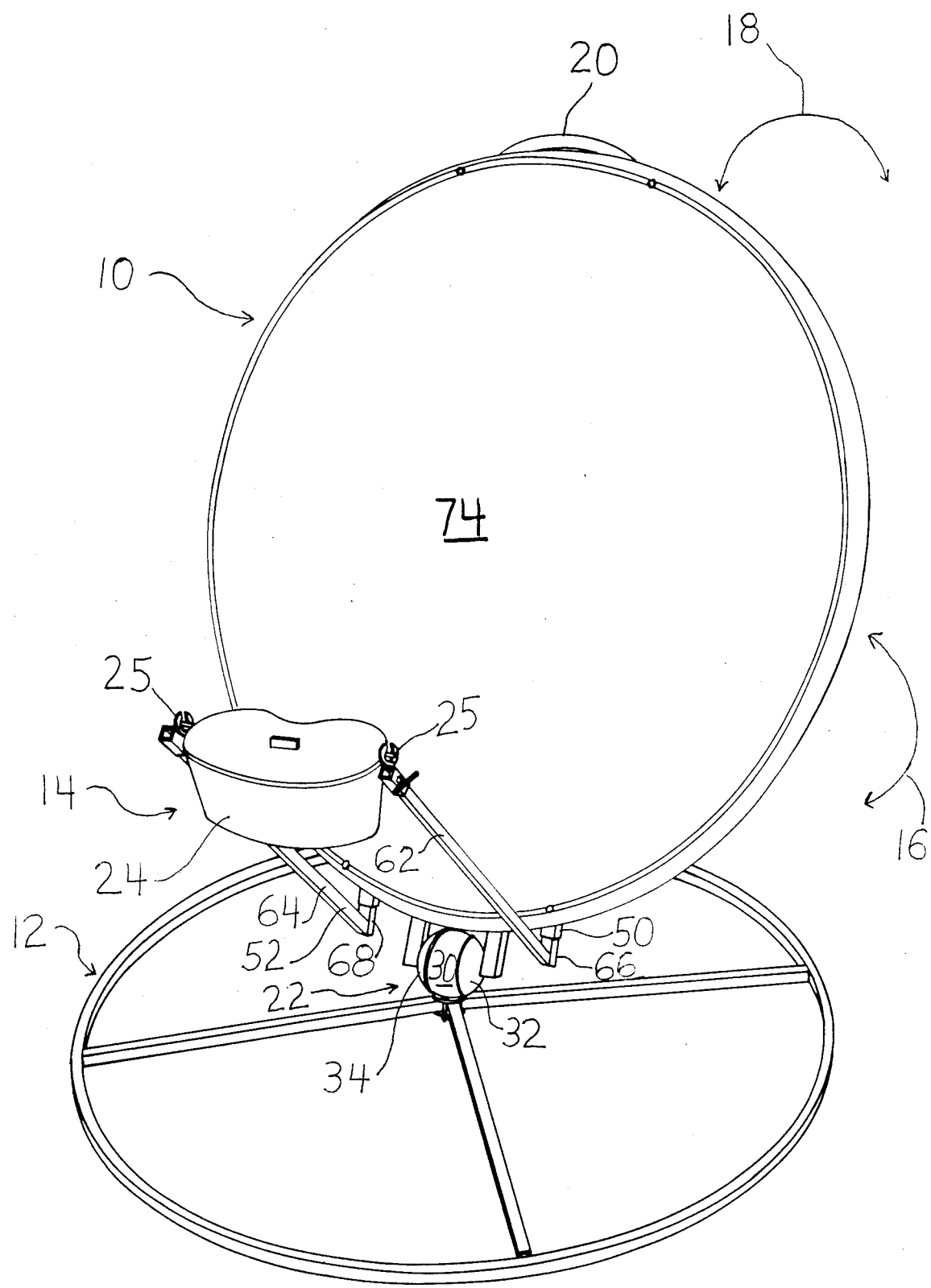
FIG. 1 is a perspective view of the apparatus of the present invention.

As illustrated in FIG. 1, the present invention comprises a parabolic reflecting dish 10, a base member 12 and a cooking apparatus 14. The dish 10 is infinitely rotatable relative to base 12, but insofar as an apparatus utilizing solar energy is concerned, rotation about a vertical axis represented by arrow 16 (the azimuth), and rotation about an arc represented by arrow 18 (the elevation) are the primary modes of rotation. The reflecting dish 10 is covered with a highly reflective material such as polished aluminum, polyester-coated aluminum or a polyester-silver film.

Figure 2:
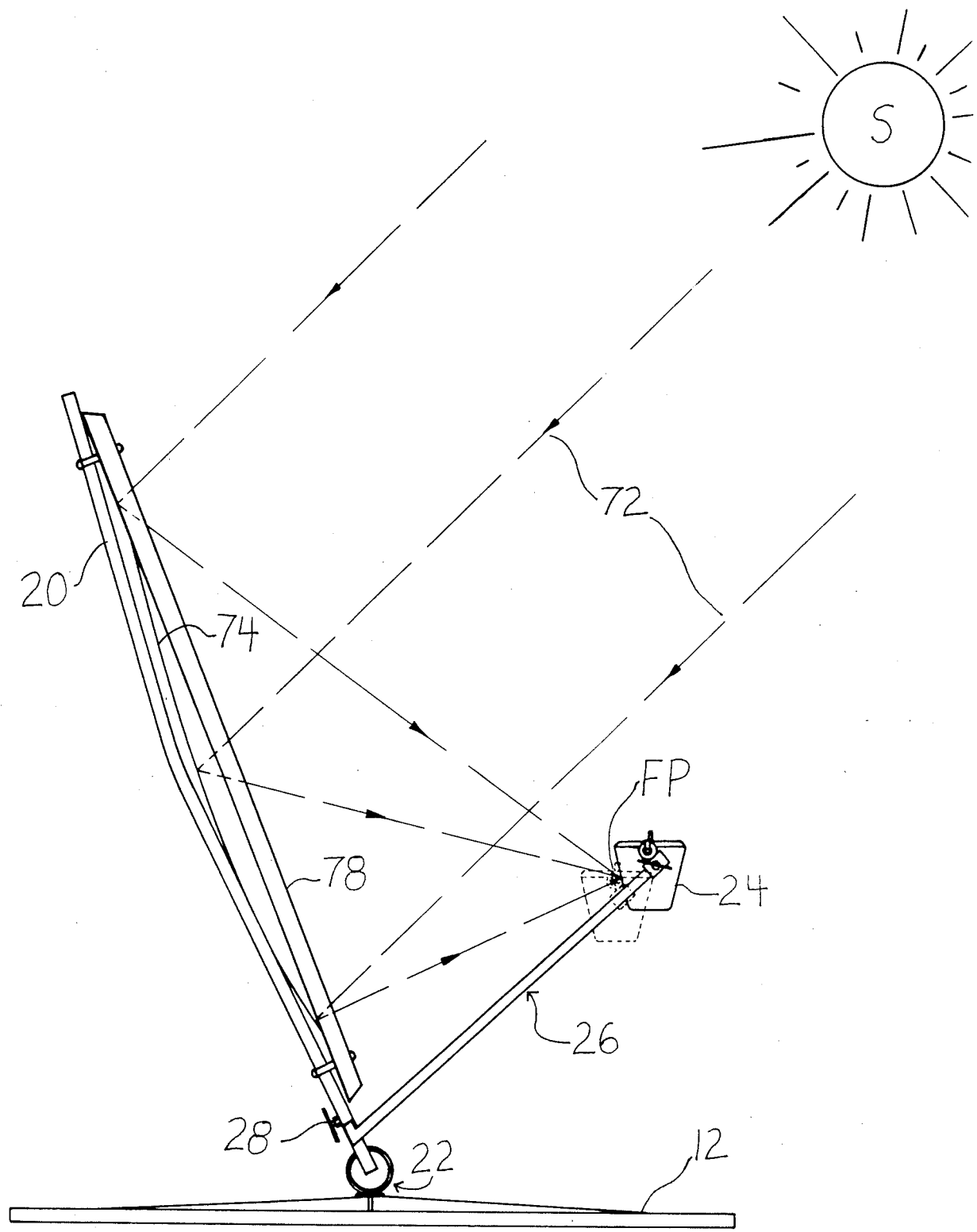
FIG. 2 is an enlarged partial view of the adjustment means of the present invention.

As illustrated in FIG. 2, the dish 10 is supported by a first frame 20 which in turn is interconnected to the base 12 by means of adjustment means, generally indicated at 22. The cooking apparatus 14 comprises a food receptacle 24 which is gimballed at 25 to a second frame 26. The frame 26 may be secured to frame 20 by any conventional means, however simply bolting the two components together, as at 28 is effective.

Figure 3:
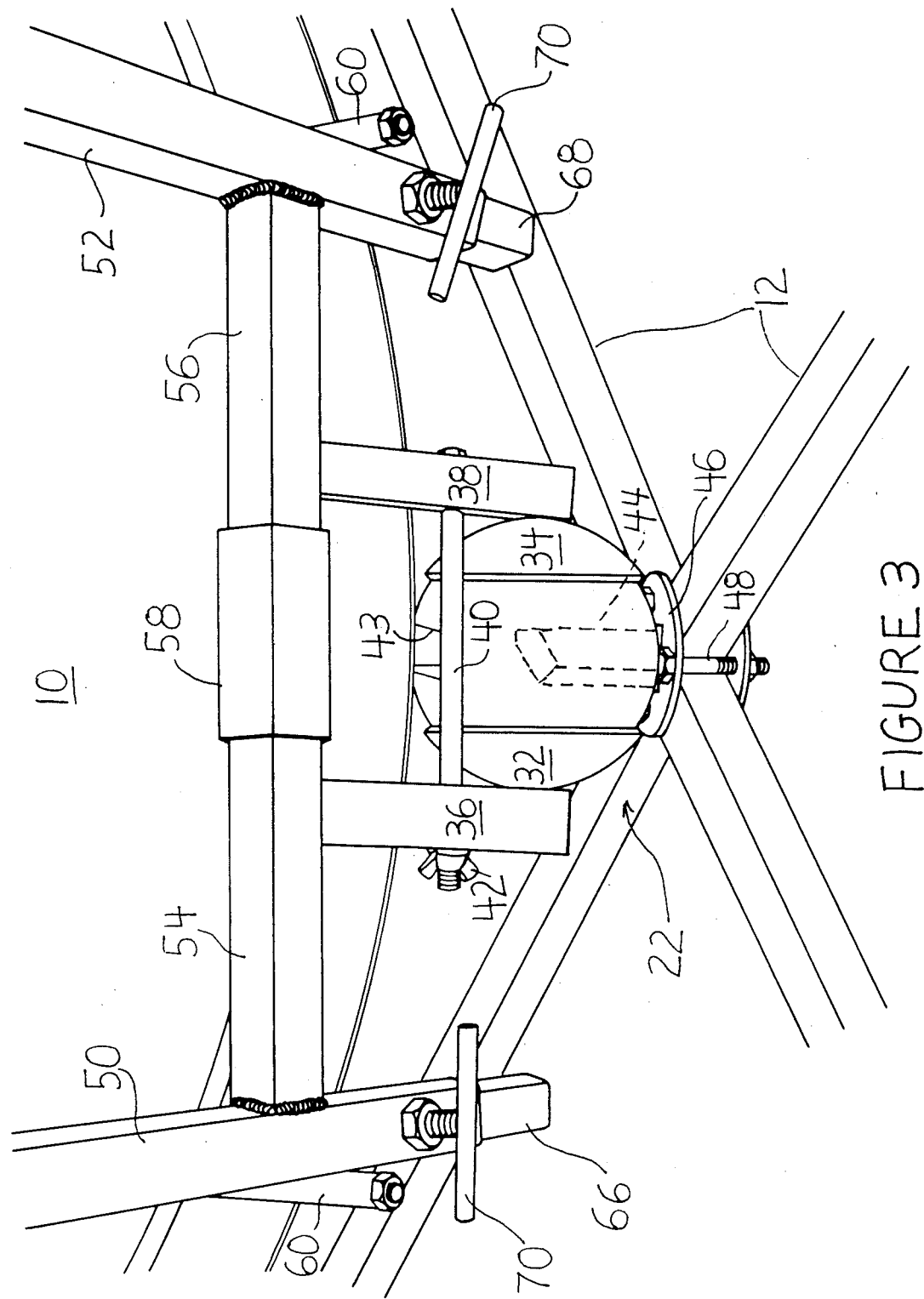
FIG. 3 is a side elevational view of the present invention illustrating the focusing of suns' rays on a cooking unit.

Referring now specifically to FIG. 3, the particular construction of the adjustment means 22 may be observed. Generally speaking, the adjustment means 22 comprises a spheroid member 30 and a pair of cupped clamping means 32, 34. The cupped clamping means 32, 34 are constructed to frictionally engage the external surface of the spheroid member 30. While various methods can be used to effect the novel results to this invention, Applicant has found that by fixedly securing the clamping means 32, 34 to a pair of corresponding depending members 36, 38, and then by providing any convenient means to force the two clamping means 32, 34 about the spheroid member 30, infinite adjustment of the dish may be accomplished. As illustrated, an elongate bolt 40 through members 36, 38 may be tightened, as by wing nut 42. When sufficiently adjusted, rotation of the dish about member 30 is possible in any axis of rotation, and there is sufficient frictional engagement between the member 30 and clamping means 32, 34 to assure the dish will remain in any position relative to base 12.

Spheroid member 30 is preferably provided with an aperture 43 at least partially therethrough enabling the member 30 to be securely affixed to base 12. For example, a square aperture within member 30 may interfit with a cooperating shaft 44 (shown in FIG. 3 in broken lines) having a square cross section. The shaft 44 is affixed to a plate 46 which is in turn secured to the base member, as by one or more bolts 48. Such arrangement prevents relative movement between the spheroid member 30 and either the base 12 or dish 10.

The first frame 20 comprises frame members 50, 52 which are provided with portions 54, 56 joined by sleeve 58. Frame members 50, 52 are affixed to the dish, as by bolts 60.

The second frame 26 comprises a pair of second frame members 62, 64, which are removably affixed to first frame 20. For instance, each of the second frame members 62, 64 may be provided with an elbow portion 66, 68 having a smaller diameter than the frame members 50, 52 and fitting therein in coaxial relationship. The portions 66, 68 may be secured within the frame members 50, 52 by any means well-known to those skilled in the art such as by compression fittings 70.

It is to be understood that the method chosen to assemble the various components, and the form such components take, is not critical to the proper functioning of the present invention. Such decisions as to form are well within the knowledge of one of ordinary skill in this art.

In operation, the shaft 44 is securely affixed to base member 12. The frame members 50, 52 are separated from one another, with portions 54, 56, and clamping means 32, 34 separated from one another. The spheroid member 30 is placed between clamping means 32, 34 and frame members 50, 52 are moved back into place. The first frame 20 is then bolted to the dish 10. In order to assure frictional engagement between the clamping means 32, 34 and spheroid member 30 sufficient to retain the dish and cooking apparatus in any desired position without slippage, the clamping means are further tightened about the spheroid member 30 by tightening wing nut 42, thereby drawing members 36, 38 closer together. The entire dash and spheroid member is then lowered onto the shaft 44. The dish may then be rotated about any desired axis and will maintain its orientation until further movement is necessary.

Figure 4:
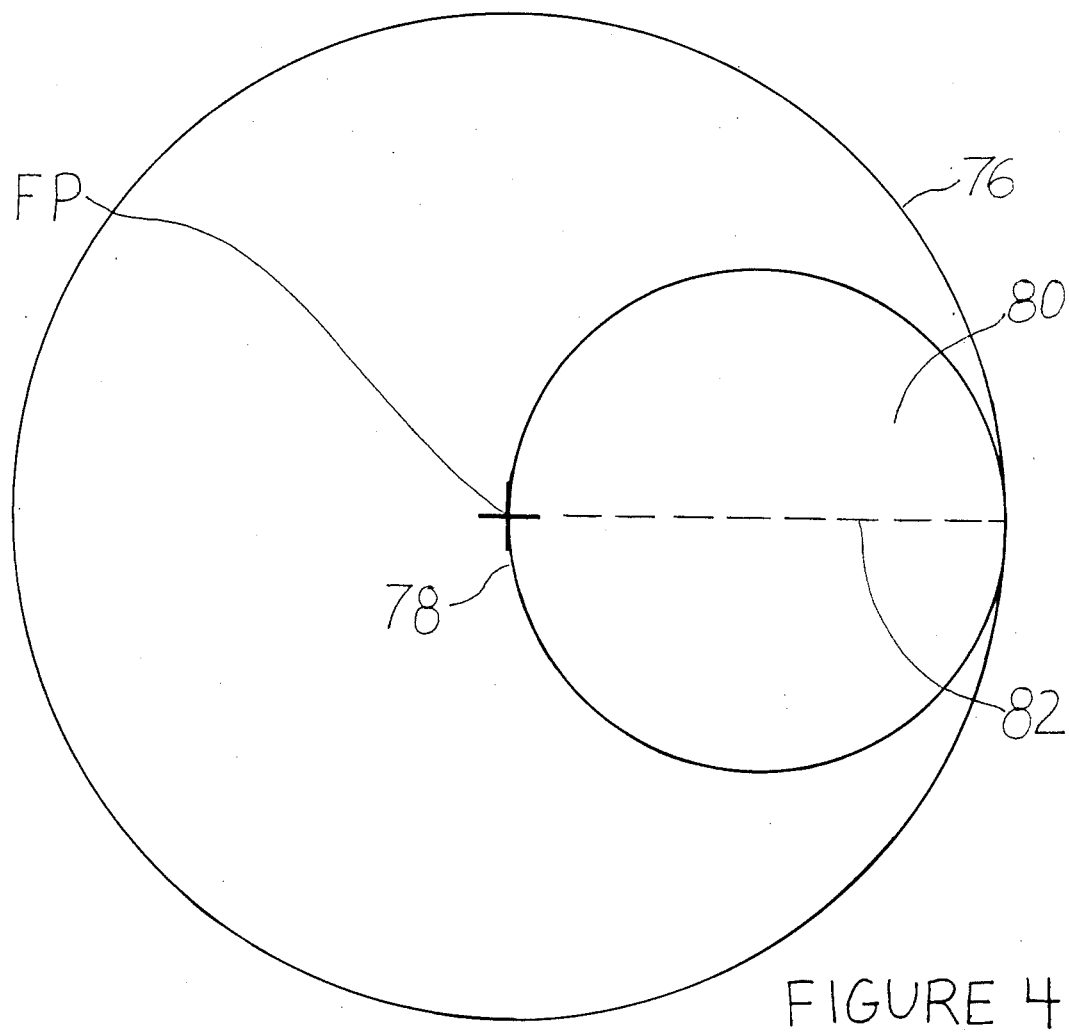
FIG. 4 is a schematic view of the relationship of an offset focus dish to a prime focus dish.

As illustrated in FIG. 2, rays 72 from the sun S strike the reflecting surface 74 of dish 10 and are reflected by surface 74 to a focal point FP. In an offset focus reflecting parabolic dish, the focal point FP does not "overlie" the centerpoint of the dish, but rather is offset therefrom depending upon the curvature of the dish 10. As illustrated in FIG. 4, the focal point FP of a prime focus parabolic dish 76 is at the center or vertex of the dish 76. An offset focus parabolic dish is a portion of the true parabolic dish 76. For example, in a representative offset focus dish 80 as illustrated in FIG. 4, the dish 80 may be cut from a peripheral portion of dish 76 with the diameter of dish 10 being co-equal to the radius of dish 76. In such case, the focal point FP remains the same: however, rather than being at the centerpoint of the dish 76, the focal point now resides at the lateral edge portion 78 of dish 80. Therefore, the focal point of the dish 10, 80 as illustrated in FIGS. 1–4, will reside in a plane aligned with the peripheral edge portion 78 of dish 10, 80 and perpendicular to the plane of the dish 10, 80.

Figure 5:
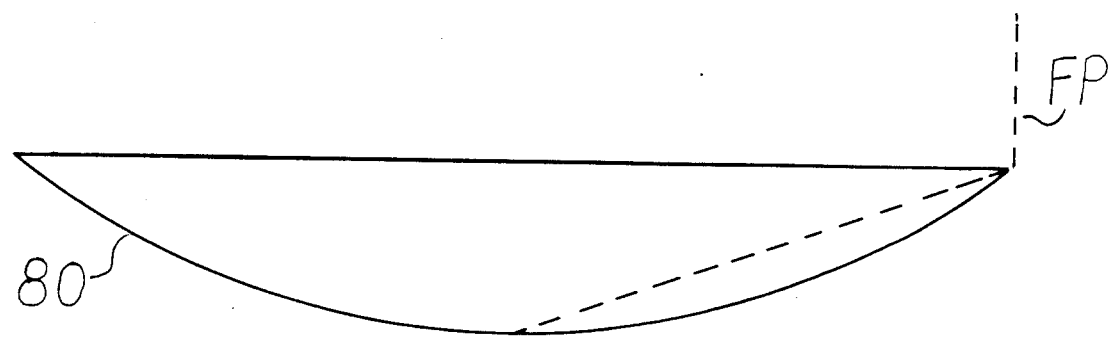
FIG. 5 is a view taken along line 5—5 of FIG. 4.

It is to be understood that the focal point of the offset focus dish used herein is a function of its geometry. An offset focus dish having a diameter less than the radius of the prime focus dish 76 will have a focal point outside a cylinder defined by the periphery of the dish 10. The inventive method and apparatus disclosed herein utilizes a dish having a focal point at or outside of such cylinder. While it is possible to actually cut such a dish from a prime focus dish, and in fact such procedure is utilized by many manufacturers of offset focus dishes, it is contemplated that the dish used herein will be configured to be formed initially having the desired geometry. As illustrated in FIG. 5, a dish 80 having a diameter exactly equal to the radius of a prime focus dish would have a focal point FP on the periphery of the dish; a dish having a diameter less than the radius of a prime focus dish would have a focal point outside such periphery. The plan view of FIG. 4 illustrates the dish 80 as circular in shape. However, it is to be understood that because the dish 76 is concave, if flattened, the dish 80 would assume an elliptical shape, with the long dimension being in the direction of the radius 82 of dish 76.

In operation, one wishing to utilize the apparatus and method of the present invention stands behind the dish 10 and rotates it to focus the sun's rays on the food receptacle 24. By rotating the dish 10 about a vertical axis in the direction of arrow 16, the azimuth of the sun may be easily set. Thereafter, by rotating the dish either forward or backward about arc 18, the elevation of the sun may be precisely set. When standing behind the dish 10 a "sun spot" identifying the focal point FP may be focused on the side of the food receptacle 24 facing the dish 10 (FIG. 2). When using black food receptacles, the sun spot will appear as a brilliant white spot on the side of the food receptacle. If for some reason maximum heating is not desired (as, for instance, in the baking of bread or maintenance of temperature) the food receptacle 24 may be "de-focused" by sliding it up or down the second frame 26 to a second position shown in broken lines in FIG. 2). While the focal point FP will not change in such case, the food receptacle will be moved away from the focal point thereby reducing the solar radiation incident on the food receptacle.

In full sun light, approximately 2,500 BTU's per hour may be focused at the focal point, at a temperature of about 3,500° F. Because the food receptacle is outside the "cylinder" defined by the peripheral edge portion 78 of dish 10, food spilled out of the food receptacle will probably not fall onto the surface 74 of dish 10. Likewise, a shadow is not cast by the food receptacle onto the reflecting surface as would be the case in a prime focus dish, which would reduce the efficiency of the device. Lastly, one utilizing this device may approach the food receptacle and actually work with food therein without damage caused by the intense heat of the focal point. By approaching the food receptacle from "behind" (in other words, keeping the food receptacle between the individual and the reflecting surface 74), the individual is always in the "defocused" portion of the reflected rays.

Applicant has found that when using a food receptacle of heavy (⅛" thick) cast aluminum, anodized black, 2½ quarts of water may be brought to a boil in 17 minutes. The dish will require an adjustment for tracking the sun approximately every 20–30 minutes in order to maintain the focal point on or adjacent the food receptacle. It is to be understood that while adjustments may be made manually, the device may be fitted with automatic mechanical tracking means well-known to those skilled in the art.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

We claim:

1. A solar cooking apparatus comprising:
   a. an offset focus reflecting parabolic dish formed such that a focal point of the dish is located radially outside a cylinder defined by the peripheral edge portion of the dish;
   b. an adjustable cooking unit affixed to the dish and positioned such that a side of said cooking unit facing the reflecting surface is located at the focal point of the dish; and
   c. adjustment means comprising a spheroid member and a pair of cupped clamping members adjustably secured thereto permitting rotation of the dish about any axis permitting the dish to track both the azimuth and elevation of the sun.

2. The apparatus as recited in claim 1, wherein the dish is securely affixed to the cupped clamping members and the cupped clamping members are moveably affixed to the spheroid member which is affixed to a base member.

3. A solar cooking apparatus including a parabolic reflecting dish and an adjustable cooking unit, comprising:
   a. a base member;
   b. an offset focus reflecting dish rotatably affixed to the base member and having a focal point radially outside of a cylinder defined by a peripheral edge portion of the dish;
   c. adjustment means having a spheroid member affixed to the base and a pair of cupped clamping members securely affixed to the dish; and
   d. an adjustable cooking unit.

4. The apparatus as recited in claim 3, wherein the dish is affixed to a first frame which is in turn securely affixed to the clamping members.

5. The apparatus as recited in claim 3, wherein dish is infinitely rotatable about said spheroid member such that the dish can track the sun in both azimuth and elevation.

6. The apparatus as recited in claim 3, wherein the adjustable cooking unit comprises a food receptacle and a second frame, said food receptacle being adjustable along said second frame.

7. The apparatus as recited in claim 6, wherein the second frame is removably affixed to the first frame.

8. A method of cooking food using solar energy comprising the steps of:
   a. concentrating solar rays on a food receptacle with an offset focus reflecting parabolic dish and adjusting the food receptacle in a plane perpendicular to the plane of the dish in order to vary the cooking temperature in the receptacle;
   b. locating a focal point of the dish and the food receptacle radially outside of the periphery of the dish;
   c. rotatably securing the dish to adjustment means attached to a base comprising a spheroid member and a pair of cupped clamping members;
   d. rotating the dish to track the sun in both azimuth and elevation; and
   e. adjusting the food receptacle in a plane perpendicular to the plane of the dish in order to vary the cooking temperature in the receptacle.

9. The method of claim 8, further comprising frictionally engaging the clamping members about the spheroid member to hold the dish in any possible position.

10. The method of claim 8, further comprising locating the food receptacle at the focal point of the dish such that the focal point is on a lateral side portion of the receptacle.

11. The method of claim 8, further comprising securing the dish to a first frame and securing the food receptacle to a second frame, said first and second frames being removably affixed to one another.

12. The method of claim 8, further comprising selecting the offset focus reflecting dish having a diameter corresponding to the radius of a prime focus reflecting dish.

* * * * *